J. B. BARTHOLOMEW.
TRACTION DEVICE FOR VEHICLE WHEELS.
APPLICATION FILED APR. 20, 1911. RENEWED JAN. 20, 1915.
1,150,846. Patented Aug. 24, 1915.
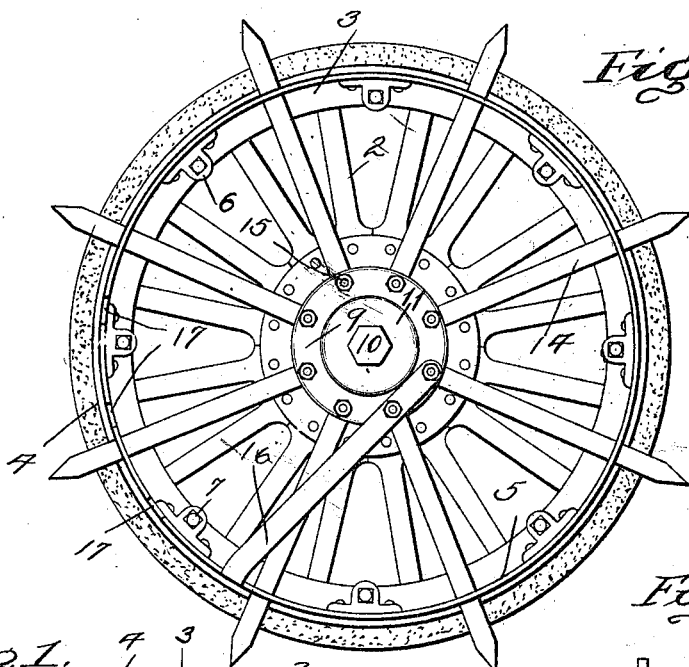
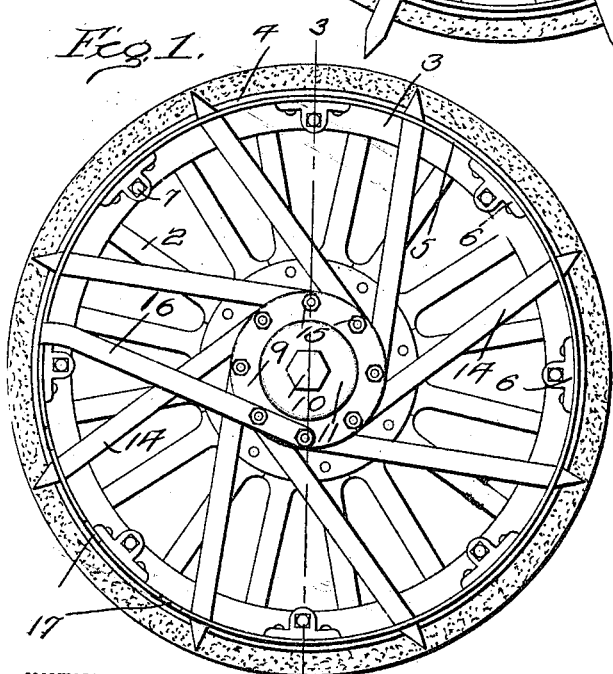
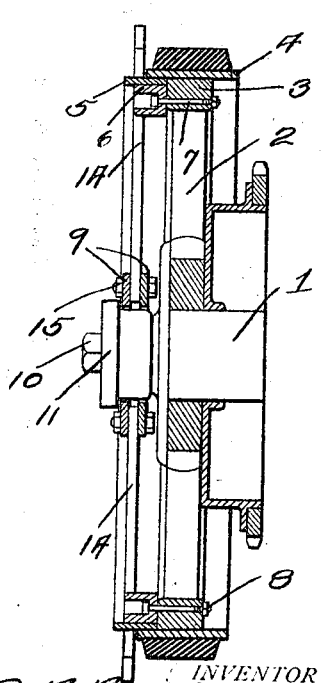
WITNESSES
N. Curtis Lammonds
Stanley W. Cook
INVENTOR
J. B. Bartholomew
By H. H. Bliss, Attorney

UNITED STATES PATENT OFFICE.

JOHN B. BARTHOLOMEW, OF PEORIA, ILLINOIS, ASSIGNOR TO AVERY COMPANY, A CORPORATION OF ILLINOIS.

TRACTION DEVICE FOR VEHICLE-WHEELS.

1,150,846.  Specification of Letters Patent.  Patented Aug. 24, 1915.

Application filed April 20, 1911, Serial No. 622,297. Renewed January 20, 1915. Serial No. 3,374.

*To all whom it may concern:*

Be it known that I, JOHN B. BARTHOLOMEW, a citizen of the United States, residing at Peoria, in the county of Peoria and State of Illinois, have invented certain new and useful Improvements in Traction Devices for Vehicle-Wheels, of which the following is a specification, reference being had therein to the accompanying drawing.

This invention relates to improvements in traction wheels and particularly to traction wheels having ground engaging members adapted to be extended at will from the peripheral part of the wheel.

One of the objects of the invention is to simplify and cheapen wheel structures of this character.

A further object is the production of ground engaging members and associated parts in the form of an attachment which can be applied without special fittings to a wheel that is essentially of the ordinary construction.

In the drawings Figure 1 is a side elevation of the attachment placed upon a traction wheel with the spike members retracted. Fig. 2 is a side elevation of the same, with spike members extended through the ring in a position for gripping the ground. Fig. 3 is a transverse sectional view on the line 3—3 of Fig. 2.

Referring to the drawings, the numeral 1 represents the hub of a traction wheel, from which extend radially the spokes 2, on the outer ends of which is fastened a felly 3. Mounted on the periphery of the felly 3, is a tire-retaining rim 4. An outer ring 5 is adapted to be placed on the outer side of the wheel and its diameter is such that it fits within the rim 4 and abuts against the felly 3. Lugs or brackets 6 are riveted to the inner surface of the ring 5 for the purpose of attaching the ring to the felly of the wheel. Bolts 7 extend through openings in the felly 3 and through the lugs 6, thereby securely retaining the ring 5 against the felly. The outer ends of the openings in the lugs 6 are countersunk and squared to receive the square heads of the bolts, the threaded ends passing through the felly are engaged by nuts 8. Two inner rings 9 of the same size are rotatably mounted on the hub cap 10 and retained by means of a flange 11 formed on the outer portion of the cap. This provides for the easy placing or removal of the inner rings by the detachment of the hub cap. A plurality of spike members 14 are pivoted at their inner ends on bolts 15 passed through the rings 9 and extend outward through apertures formed in the ring 5. A lever 16, the inner end of which is rigidly secured to the rings 9 by means of two of the pivoting bolts 15 has its outer end so shaped as to resiliently engage any one of a series of notches 17 formed in the edge of the ring 5.

From the above description, it will be seen that when the rings 9 are rotated, the spike members will be extended or retracted through the apertures in the ring 5, depending on which way rings 9 are rotated. The notches 17 are so placed in the ring 5 that when the lever 16 is in one of the extreme positions, the ends of the spike members 14 will be retracted within the periphery of the wheel and when in the opposite extreme position they will be extended to their full height beyond the edge of the wheel. Intermediate notches are provided so that the spikes may be extended different lengths varying with the nature of the ground on which the wheel is being run.

It will be seen that my invention, considered as an attachment for wheels, is very simple and can readily be applied for use. The outer ring 5, 6, can be secured to the felly of the ordinary wheel by simply making holes for the bolts 7, and the inner rings 9 are readily placed in position by simply removing and reapplying the hub cap which, of course, constitutes a part of the ordinary wheel structure. In some cases in the manufacture of motor vehicles having wheels such as shown in this application, I furnish as regular equipment ordinary wheels comprising the hub 1, spokes 2, felly 3, rim 4 and flanged hub cap 10. Then, if the special ground engaging traction devices are desired, the other parts of the structure which I have shown in the drawings are furnished as an attachment, and it will be seen that these parts can be attached to the regular wheel structure without any special appliances or without the addition of any devices to the wheel structure. The outer ring structure 5, 6, is readily secured to the felly 3 of the wheel and the inner rings 9 are readily secured in position by the flanged hub cap. Furthermore, when the user desires to dispense with the use of the special ground engaging devices, their removal leaves a standard wheel structure that is not in any way disfigured by any attaching devices.

When desired, it is possible, of course, to furnish a flanged hub cap as a part of the attachment so that the attachment can be used on wheels that are not provided with a hub cap, or which have a hub cap unsuited for the use of an attachment.

The use of two inner rings with the ends of the spike members secured between them gives a very simple but effective construction. The securing of the hand lever 16 to the inner rings in the manner set forth produces a construction that is both simple and inexpensive.

What I claim is:

A tractor attachment for wheels comprising in combination an apertured ring adapted to be removably secured to the peripheral part of a wheel, a series of outwardly extending spikes in the apertures of the ring, an inner ring arranged to surround and be supported by the detachable hub cap of the wheel, said ring being held from axial displacement by the hub cap flange, the inner ends of the spikes being pivotally secured to the said ring, and a lever arm having its inner end secured to the said inner ring with its outer end arranged adjacent the outer ring and adapted to enter notches formed in the said apertured ring and thereby be secured in different angular positions.

In testimony whereof I affix my signature, in presence of two witnesses.

JOHN B. BARTHOLOMEW.

Witnesses:
J. M. CALDWELL,
L. M. STACY.